S. McNABB.
WINDMILL.
APPLICATION FILED JULY 6, 1911.

1,018,203.

Patented Feb. 20, 1912.

WITNESSES
C. K. Davis
M. E. Moore

INVENTOR
Sherman McNabb
Attorney

UNITED STATES PATENT OFFICE.

SHERMAN McNABB, OF PRAGUE, OKLAHOMA.

WINDMILL.

1,018,203. Specification of Letters Patent. Patented Feb. 20, 1912.

Application filed July 6, 1911. Serial No. 637,128.

*To all whom it may concern:*

Be it known that I, SHERMAN MCNABB, a citizen of the United States, residing at Prague, in the county of Lincoln and State of Oklahoma, have invented certain new and useful Improvements in Windmills, of which the following is a specification.

My invention relates to improvements in wind-mills and is designed to provide a light, easy-running machine for actuating a pump, or for other suitable purposes.

The object of the invention is the provision of a machine of this character which is applicable for use on towers of standard construction; which is easy running and efficient in transmitting rotary power generated by means of the wind pressure, into the reciprocating power exerted by the vertically movable pump rod, and which includes novel means for throwing the machine out of the wind in the event the wind pressure becomes excessive.

The invention consists in certain novel features of construction and combinations and arrangements of parts as hereinafter specified and more clearly pointed out in the claims.

In the accompanying drawings I have illustrated one example of the physical embodiment of my invention constructed according to the best mode I have so far devised for the practical application of the principles.

Figure 1:
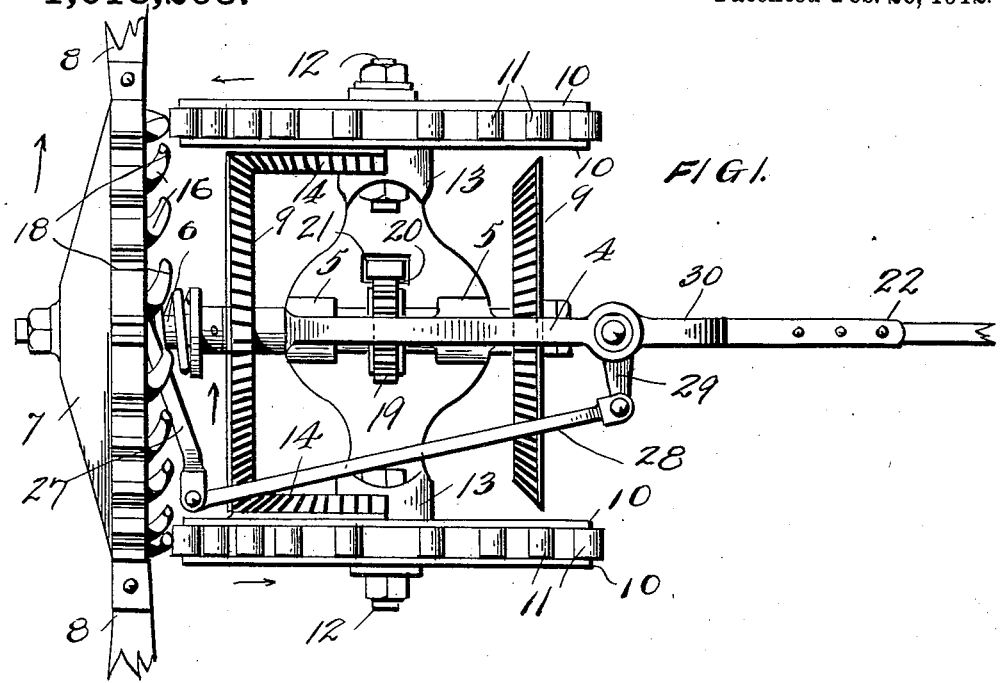
Figure 2:
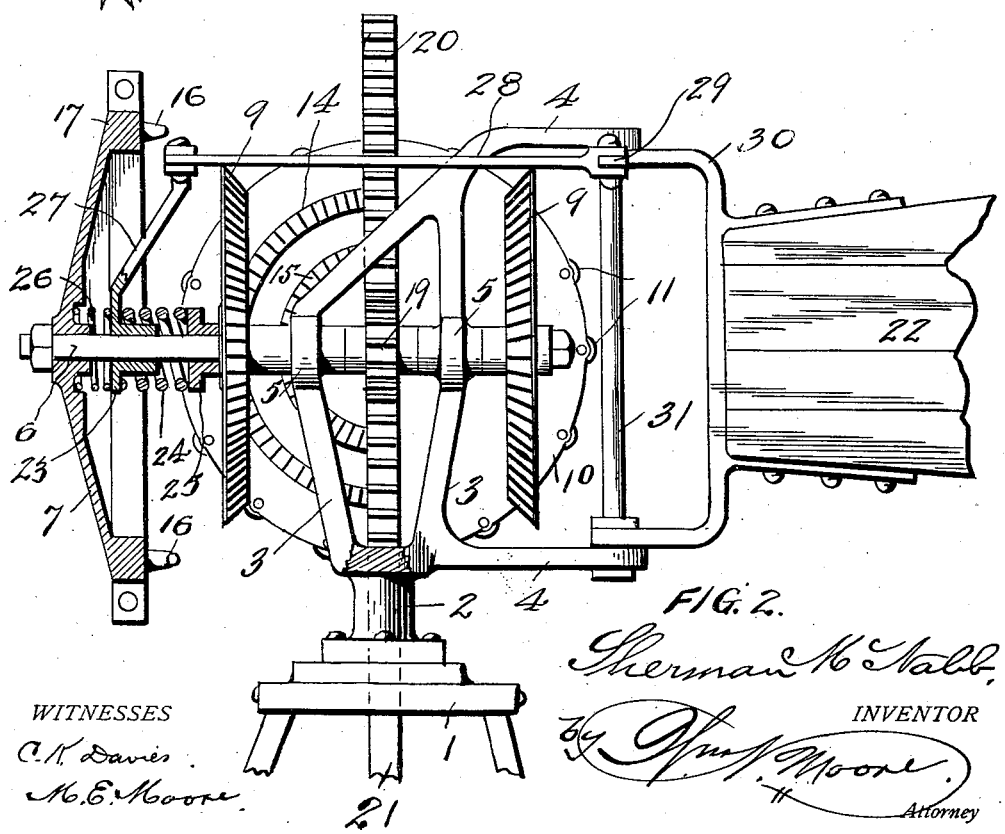

Figure 1 is a top plan view of so much of a wind machine embodying the novel features of the invention, as to properly illustrate the same. Fig. 2 is a part elevation and part sectional view of Fig. 1.

As before stated the machine is adaptable for use with standard towers, such as indicated by the numeral 1. Rotatably supported upon the tower is the head 2 from which rises the supporting frame which comprises the diverging arms 3, 3, and the fan supporting arms 4, 4. The diverging arms 3, 3, are provided with trunnions or bearings 5, 5, in which is journaled the shaft 6. The shaft is located in a horizontal position with relation to the head and at one end has loosely journaled thereon the vane disk 7 from the perimeter of which extend the vanes 8, of usual or well known construction. The shaft 6 also supports the bevel gear wheels 9, 9, located at each side of the center of the head and splined or keyed to the shaft to rotate therewith.

Arranged at right angles to the bevel wheels 9 are a pair of roller carrying members comprising plates 10, between which are rotatably suspended a series of rollers 11. These members are fixed to revolve with the stud shafts 12 journaled in bearings 13 which are formed integrally with the head 2. The inner plate of each roller carrying member or disk is provided on its face with a segmental bevel rack or portion of a wheel 14, the teeth of which are adapted to mesh with the teeth of the bevel gears 9. A second, smaller annular segmental rack 15 is also provided, by means of which the gearing may be changed if desired. The roller disks are rotated by means of contact arms 16 arranged in a series about the flange 17 of the vane disk 7. These arms somewhat resemble horns in their conformation and are provided with rounded ends 18 which impinge against the rollers 11, as the vane disk is rotated by wind pressure.

The rotary motion of the machine is transmitted into reciprocating motion by means of the rack wheel 19 on shaft 6 and located between the bearings 5, 5. This wheel engages the rack 20 formed at the upper end of the pump rod 21, and moves the same vertically.

From this description taken in connection with the drawings it will be evident that the rotation of the vane disk causes the arms 16 carried thereby to impinge with the rollers 11. When the vane disk is rotating in the direction of the arrow in Fig. 1, the two disks carrying rollers 11 are rotated as indicated by the arrows, by contact of the arms 16 with the rollers 11. The motion of the disks is alternately transmitted to the wheels 9 by the segmental annular racks 14, thus rotating the rack wheel 19 to lower the pump rod 21, in the position illustrated in Fig. 1.

For turning the fan 22 and throwing the machine out of the wind I utilize the slidable sleeve 23 and spring 24. The sleeve and spring are located about the shaft 6 and the spring abuts against a stationary headed or flanged sleeve 25. A second spring 26 is located between the vane disk and the sleeve 23 to form a cushion between the members. An arm 27 rises from the sleeve 23 and this arm is connected by link 28 to the lever arm 29 of the fan frame 30. The fan frame is pivoted on the pintle 31 which is affixed in the bars 4, 4 of the head. Thus the movement of the vane disk on the shaft 6, due to unusual and excessive wind pressure moves the sleeve 23 overcoming the tension of the spring 24 and pressing it against the abutment 25. The movement of the sleeve pushes link 28 which swings the fan on its pintle 31 to throw it out of the wind, as will be understood.

Having thus fully described my invention what I claim as new and desire to secure by Letters Patent is:—

1. The combination in a wind-mill with a rotatable frame and a shaft supported therein, of a vane disk loosely mounted on said shaft, revoluble members provided with anti-friction devices with which said vane disk engages, a pair of bevel gears on said shaft, means carried by said revoluble members for alternately engaging each of said gears, a pump rod and connections thereto for reciprocating the same.

2. The combination with a rotatable frame and a shaft supported therein, of a wind wheel, revoluble members adapted to be rotated by contact from said windwheel, a pair of oppositely disposed bevel gears on the shaft, and means carried by said revoluble members for alternately engaging said bevel gears to rotate them in opposite directions.

3. The combination with a rotatable frame and a shaft, of a windwheel, a pair of disks each provided with rollers, segmental gears on said disks, a pair of oppositely disposed bevel gears adapted alternately to be rotated in opposite directions by said segments, a pump rod with a rack thereon, and a rack wheel on said shaft.

4. The combination with a rotatable frame and a shaft, of a windwheel provided with contact arms, a pair of disks each provided with rollers about its periphery, a segmental gear on each disk, a pair of oppositely disposed bevel gears for alternate engagement with said segments, a pump rod with a rack thereon and a rack wheel for reciprocating said rod.

5. The combination with a rotatable frame, a shaft, a windwheel, a pump rod and mechanism for transmitting the motion of the windwheel to the pump rod, of means for throwing the mechanism out of the wind, said mechanism comprising diverging arms rising vertically from the frame, parallel arms extending outwardly at substantially right angles to the diverging arms, a vertical pintle mounted upon said parallel arms at right angles thereto, a yoke-shaped frame pivoted thereto, a fan carried thereby, a slidable sleeve yieldingly secured upon the shaft, a stationary headed sleeve, a cushioning means interposed between said slidable sleeve and windwheel, a lever arm on the fan, a push bar on the slidable sleeve, and a link connecting said arm and bar.

6. The combination with a rotatable head and frame, of a horizontal shaft carried thereby, a vane disk mounted thereon at one end, a pair of oppositely disposed gears rotatably mounted upon the shaft at each side of the center of the head, revoluble members arranged at right angles to said gears, means carried by said members adapted to engage said gears on the shaft to rotate them in opposite directions, means carried by the vane disk for rotating the said revoluble members, a rack wheel mounted upon the shaft intermediate the oppositely disposed gears, a vertically disposed pump rod, a rack carried thereby engaging said rack wheel to transmit the rotary motion of the gear wheels to reciprocating motion for the pump rod, and automatic means carried by the horizontal shaft for throwing the vane disk out of the wind.

In testimony whereof I affix my signature in presence of two witnesses.

SHERMAN McNABB.

Witnesses:
J. E. GROMITT,
J. O. MORGAN.